United States Patent [19]

Quintal

[11] Patent Number: 4,468,606

[45] Date of Patent: Aug. 28, 1984

[54] SYSTEM FOR CHARGING THE BATTERY AND OPERATING THE ELECTRICAL ACCESSORIES OF A SAIL-BOAT

[76] Inventor: Yvan Quintal, 12,663 Fortin St., Montreal-North, Canada, H1G 4A3

[21] Appl. No.: 375,885

[22] Filed: May 7, 1982

[51] Int. Cl.³ .............................................. H02J 7/00
[52] U.S. Cl. ....................................... 320/61; 114/39; 320/68
[58] Field of Search ................. 290/4; 320/61, 64, 68, 320/69; 440/1, 64; 114/39

[56] References Cited

U.S. PATENT DOCUMENTS

| | | | |
|---|---|---|---|
| 2,651,749 | 9/1953 | Weber | 320/69 X |
| 3,238,911 | 3/1966 | Pazulski | 114/39 |
| 3,411,013 | 11/1968 | Vogelsang | 114/39 X |
| 4,059,771 | 11/1977 | Jacobs et al. | 320/64 X |

Primary Examiner—William M. Shoop

[57] ABSTRACT

A system for charging the battery and operating the electrical accessories of a sail-boat is disclosed. The system comprises an alternator having a stator winding adapted for connection to the battery through suitable current rectifiers and a rotor field winding coupled to the auxiliary propeller shaft of the boat. Circuit means for controlling the energization of the field winding of the alternator from the output voltage of the stator winding, so as to permit the alternator to provide adequate current to charge the battery and operate the electrical accessories of the sail-boat, and a voltage regulator adapted for connection to the field winding of the alternator for controlling the output voltage of the stator winding when such output voltage reaches a predetermined value.

9 Claims, 3 Drawing Figures

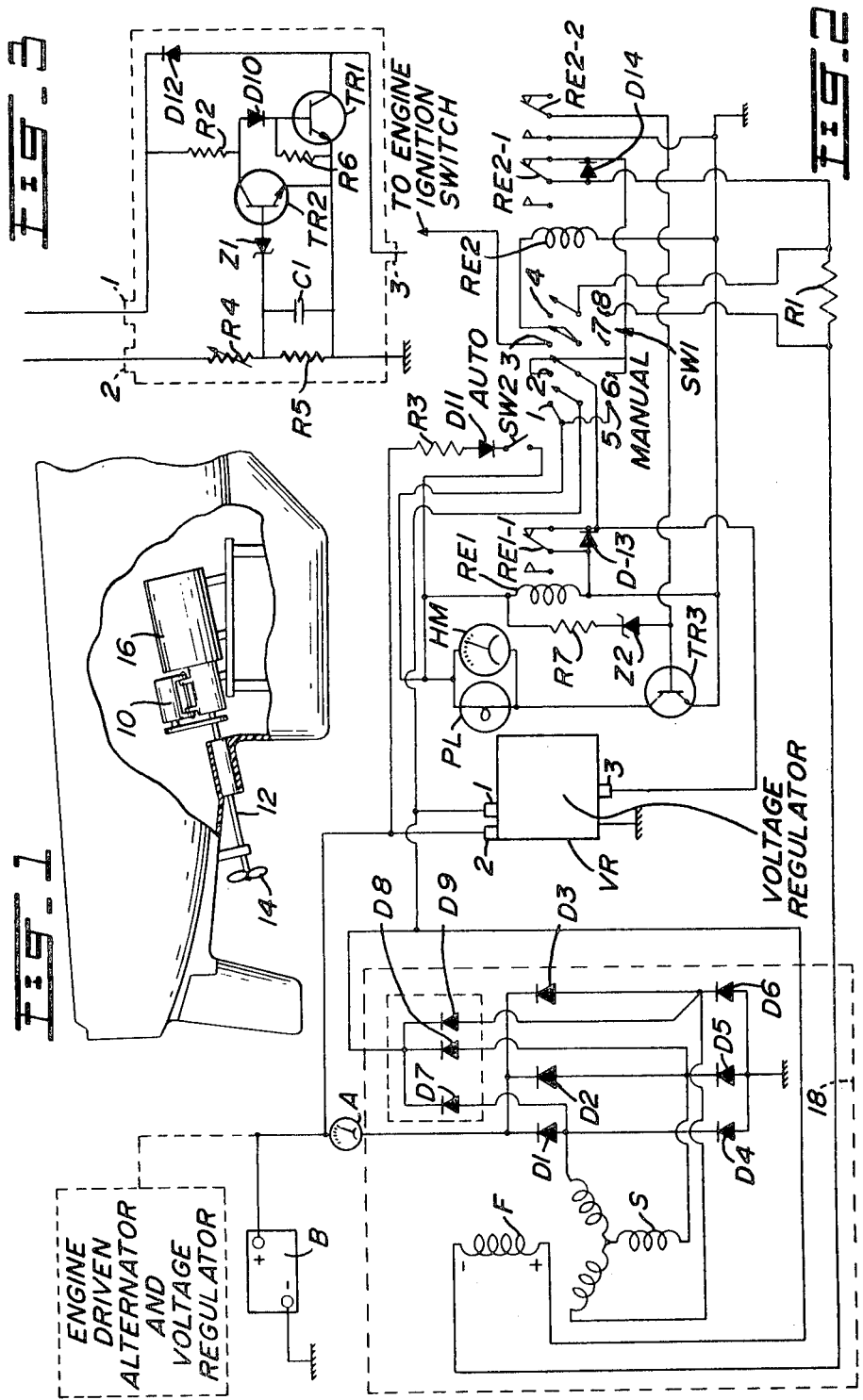

SYSTEM FOR CHARGING THE BATTERY AND OPERATING THE ELECTRICAL ACCESSORIES OF A SAIL-BOAT

This invention relates to a system for charging the batteries and for operating the electrical accessories of a sail-boat.

Sail-boats are now equipped with a large number of electrical accessories. However, while sailing, a number of these accessories cannot be properly used because the batteries of the boat cannot be adequately recharged. Indeed, there are on the market a number of systems for recharging the batteries while sailing but these known systems provide a low amperage output which is clearly inadequate to satisfy the power requirements of the electrical accessories found nowadays on large sail-boats.

It is therefore the object of the present invention to provide a system capable of generating enough current for charging the batteries and for operating the regular electrical accessories of a sail-boat while sailing.

The system, in accordance with the invention, comprises an alternator having a stator winding adapted for connection to the battery through suitable current rectifiers and a rotor field winding coupled to the auxiliary propeller shaft of the boat, circuit means for controlling the energization of the field winding of the alternator from the output voltage of the stator winding so as to permit the alternator to provide adequate current to charge the battery and operate the electrical accessories of the sail-boat, and a voltage regulator adapted for connection to the field winding of the alternator for controlling the output voltage of the stator winding when such output voltage reaches a predetermined value.

The above circuit means preferably includes a relay connected to the output of the stator winding and having normally closed contacts completing the energizing circuit of the field winding when the rotor speed is below a predetermined value, said relay causing opening of said contacts when the rotor speed is above said predetermined value, the energizing circuit of the field winding being then completed through the voltage regulator.

The above circuit means preferably also comprises a manual switch means located in the energizing circuit of the field winding and having a closed contact position and an open contact position for the energizing field winding and so remove the drag on the sail-boat when the wind velocity is low and/or during a wave.

The above circuit means also preferably comprises a second relay which is operated from the auxiliary engine ignition switch and have normally closed contacts in the energizing circuit of the rotor field winding for de-energizing the rotor field winding when the auxiliary engine is in operation. The above switch means preferably has a second closed contact position which allows such second relay to remain de-energized when the engine ignition switch is closed, so as to connect the alternator in parallel with the regular alternator of the emergency engine when such regular alternator is defective.

Such circuit means may also include a pilot light and an hour meter connected in series with a transistor across the output of the stator winding for indicating that the alternator is working and also the total length of time it has been in operation. The above-mentioned relay preferably has normally open contacts which, when closed during operation of the auxiliary engine, de-energize the above transistor to switch off the pilot light and the hour meter.

The above circuit means also preferably includes an optimizing resistor connected in the rotor field winding for adjusting the optimum current of the stator winding for a predetermined boat speed, so as to reduce to a minimum the drag of the alternator on the boat. In the manual position, the optimizing resistor is short circuited.

The alternator normally starts on the residual magnetism of the rotor field winding, but a reset circuit may be provided for initially energizing the rotor field winding from the battery when the residual magnetism of the rotor field winding is too low, because the system has not been utilized for a long period of time.

The invention will now be disclosed, by way of examples, with reference to the accompanying drawings, in which:

FIG. 1 illustrates the system in accordance with the invention mounted on the regular auxiliary engine of the sail-boat;

FIG. 2 is a wiring diagram of the system in accordance with the invention; and

FIG. 3 is a wiring diagram of a voltage regulator which may be used with the system of FIG. 2.

Referring to FIG. 1 of the drawings, there is shown an alternator 10 coupled to the shaft 12 of the propeller 14 of a sail-boat which may be powered by an auxiliary engine 16. The alternator should be capable of generating full current capacity at a propeller shaft velocity of 600 RPM. If the ratio of the diameter of the pulley mounted on the shaft to the one mounted on the alternator is chosen as about 3:1, starting current capacity should be obtained when the shaft of the propeller rotates at about 170 RPM. In such a system, the propeller operates as a turbine to drive the alternator when the boat is operated by a sail. Using 18"×12" three-blade conventional propeller, it has been found that at 7 knots, the alternator can generate 24 amperes.

Referring to FIG. 2, there is shown the wiring diagram 18 of a conventional alternator comprising a stator winding S and a field winding F. As commonly known, the stator winding of an alternator is fixed, but the field winding is mounted for rotation on the shaft of the alternator. The stator winding S is connected to a bridge rectifier including diodes D1 to D6 in order to convert the AC output of the alternator into a DC output which is fed to the battery 8 to charge the battery and operate the electrical accessories of the sail-boat. The DC output of the diodes is applied to the battery 8 of the boat through an ammeter A. The stator winding also supplies DC field current to the field winding F through a diode trio including diodes D7 to D9. When the rotor field winding starts rotating under the action of the propeller, the residual magnetism in the field is sufficient to cause the generator to build up an adequate DC output voltage which is applied to the positive terminal of field F. The negative terminal of field F is connected to ground by means of a circuit in accordance with the present invention including relays RE1 and RE2; an optimizing resistor R1 and main switch SW1 which may be set in either an OFF position, and AUTO position, or a MANUAL position.

When the manual switch SW1 is in the AUTO position, the wipers of the switch are in contact with terminals 1-4 and the negative terminal of the field winding F is connected to ground through resistor R1, closed contacts RE1-1 and RE2-1 of relays RE1 and RE2 respectively, and terminal 2 of switch SW1.

When the auxiliary engine is running, and the main switch SW1 is in AUTO position, relay RE2 is energized from the engine ignition switch through terminal 3 of switch SW1 and the field winding is opened at contacts RE2-1. Since the field winding of the alternator is opened, no voltage will be generated at the stator winding.

If the auxiliary engine is not running, relay RE2 is released and the field circuit of the alternator is closed. When the boat starts to move under the power of the sail, the propeller rotates and the residual magnetism of the field is normally sufficient to cause the generator winding to produce current, some of which is fed back to the field to gradually build up the magnetism of the field. As the speed of the boat increases, the output of the stator winding reaches its normal operating voltage of about 12 volts. Relay RE1 is a voltage-sensitive relay which is energized from the output of the stator winding through terminal 1 of switch SW1 when the output of the stator winding reaches about 12 volts. When relay RE1 is energized, normally closed contacts RE1-1 are opened. When contacts RE1-1 are opened, ground is removed from the negative terminal of the field winding and control of the field winding is then transferred to terminal 3 of a conventional voltage regulator VR, the circuit diagram of which is shown in FIG. 3 of the drawings. If relay RE1 was not present, it would then be impossible to start building up the residual magnetism at low r.p.m., because transistor TR1 would be not conducting. To overcome this difficulty, reset switch SW2 would have to be manually closed each time one wishes to use the alternator, if the user forgets to open switch SW2 when the propeller shaft speed falls below 170 r.p.m. Current will then be drawn from the batteries.

Current from the output of the stator winding flows to terminal 1 of voltage regulator VR, resistor R2, diode D10, and the base-emitter of transistor TR1 to ground. This turns on transmitter TR1 and terminal 3 of the voltage regulator is thus connected to ground through the emitter-collector of transistor TR1. Current therefore continues to flow through the field winding of the alternator. It will be noted here that the voltage regulator VR is not connected to the circuit until the output voltage of the alternator has reached its normal operating value. This saves the energy of the battery which, in conventional voltage regulators, is permanently connected to terminal 1 of the voltage regulator in order to render transistor TR1 conductive and provide ground to the negative terminal of the field winding before the rotor starts to rotate. In the present invention, the alternator starts on the residual magnetism of the field and relay RE1 transfers control of the field winding to the voltage regulator only when the output voltage of the alternator has reached its normal value. In case the residual magnetism is too low to start operation of the alternator, the battery may be temporarily connected to terminal 1 of the voltage regulator through a reset circuit including a resistor R3, diode D11 and manual reset switch SW2.

The number 2 terminal on the voltage regulator is always connected to the battery, but the discharge current is limited to a negligible value by the high resistances of resistors R4 and R5. As the propeller speed and the output voltage of the alternator increase, the voltage between resistors R4 and R5 increases to the point where Zener diode Z1 conducts. Transistor TR2 then turns on and transistor TR1 is short circuited and turns off. With transistor TR1 off, the field circuit is opened and the alternator output voltage decreases. Z1 then blocks current flow, causing transistor TR2 to turn off and transistor TR1 to turn back on. The field current and system voltage increase, and the cycle then repeats many times per second to limit the alternator voltage to a preset value.

Capacitor C1 smooths out the voltage across resistor R5, resistor R6 prevents excessive current through transistor TR1 at high temperatures and diode D12 prevents high-induced voltages in the field winding when transistor TR1 turns off. Resistor R4 is a thermistor which causes the regulated voltage to vary with temperature, thus providing the optimum voltage for charging the battery.

A pilot light PL and an hour meter HM are connected in series with a transistor TR3 across relay RE1 to monitor the operation of the alternator. As the output voltage of the alternator increases, Zener diode Z2 becomes conductive through resistor R7 and transistor TR3 turns on. It will be noted that the base of transistor TR3 is connected to ground through contacts RE2-2 when relay RE2 is energized (auxiliary engine running) to turn off the transistor and shut off the pilot light and the hour meter.

The alternator in accordance with the present invention may also be used as a back-up alternator when the main alternator and voltage regulator (shown in dash line in FIG. 2) are defective, or two alternators may be used in parallel when very fast charging of the batteries is required, if they are too low. In such a case, switch SW1 is turned to the MANUAL position, shown in FIG. 2 of the drawings. Wipers of switch SW1 are then in contact with terminals 5-8. In such position, relay RE2 cannot be energized, because terminal 7 of switch SW1 is not connected to the relay. Thus, the field winding of the alternator is not cut off. In addition, the optimizing resistor is short circuited through terminal 8 of switch SW1. Obviously, the optimizing resistor R1 is not required when the boat is powered by the auxiliary engine. Also, from the above, the alternator operates in the same manner as in the AUTO position as terminals 5 and 6 are connected to terminals 1 and 2.

When switch SW1 is OFF (not in contact with terminals 1-4 or terminals 5-8), the alternator field is disconnected at terminals 2 or 6 and the alternator does not produce any output. This setting may be used when a minimum drag on the boat is required, such as when the wind is low or during a race.

Diodes D13 and D14 prevent arcing at the contacts RE1-1 and RE2-1 when these contacts are open.

Although the invention has been disclosed with reference to a preferred embodiment, it is to be understood that alternatives are also envisaged and that the invention is to be limited by the scope of the claims only.

What I claim is:

1. In combination with a sail-boat having an auxiliary engine driving a propeller of the fixed blade type secured to an auxiliary propeller shaft and for use when the wind is too low to propel the boat, a system for charging the battery and operating the electrical accessories of said sail-boat, comprising:

(a) an alternator having a stator winding adapted for connection to the battery through suitable current rectifiers and a rotor field winding coupled to said auxiliary propeller shaft;

(b) circuit means for controlling the energization of the field winding of the alternator from the output voltage of the stator winding, so as to permit the alternator to provide adequate current to charge the battery and operate the electrical accessories of the sail-boat; and (c) a voltage regulator adapted for connection to the field winding of the alternator for controlling the output voltage of the stator winding when such output voltage reaches a predetermined value, and (d) said circuit means including an optimizing resistor connected in said rotor field winding for adjusting the optimum output current of the stator winding for a predetermined boat speed, so as to reduce to a minimum the drag of the alternator on the boat.

2. A system as defined in claim 1, wherein said circuit means includes a relay (RE1) connected to the output of the stator winding and having normally closed contacts completing the energizing circuit of the field winding when the rotor speed is below a determined value, said relay causing opening of said contacts when the rotor speed is above said predetermined value, the energizing circuit of the field winding being then completed through the voltage regulator, whereby battery discharging is prevented when said rotor speed is below said predetermined value.

3. A system as defined in claim 2, wherein said circuit means further comprises manual switch means (SW1) located in the energizing circuit of said field winding and having a closed contact position (AUTO) and an open contact position (OFF) for de-energizing the field winding and so remove the drag on the sail-boat when the wind velocity is low or during a race.

4. A system as defined in claim 3, wherein said circuit means further comprises a second relay (RE2) which is operated from the auxiliary engine ignition switch and having normally closed contacts in the energizing circuit of the rotor field winding for de-energizing the rotor field winding when the auxiliary engine is in operation.

5. A system as defined in claim 4, wherein said switch means has a second closed contact position (MANUAL) which allows said second relay to remain de-energized when the engine ignition switch is closed, so as to connect the alternator in parallel with the regular alternator of the auxiliary engine when said regular alternator is defective, or to charge the batteries by the two alternators.

6. A system as defined in claim 4, wherein said circuit means includes a pilot light and an hour meter connected in series with a transistor across the output of the stator winding for indicating that the alternator is working and the total length of time it has been in operation, respectively.

7. A system as defined in claim 6, wherein said second relay has normally open contacts which, when closed during operation of the auxiliary engine, de-energize said transistor to switch off the pilot light and the hour meter.

8. A system as defined in claim 5, wherein said switch means in its second closed contacts position short circuits said optimizing resistor.

9. A system as defined in claim 1, 2 or 3, wherein the alternator starts on the residual magnetism of the rotor field winding, but further comprising a reset circuit for initially energizing the rotor field winding from the battery when the residual magnetism of the rotor field winding is too low, because the system has not been utilized for a long period of time.

* * * * *